(12) United States Patent
Nagasawa (10) Patent No.: US 7,133,078 B2
(45) Date of Patent: Nov. 7, 2006

(54) AUTOMATIC FOCAL POINT SENSING DEVICE

(75) Inventor: Nobuyuki Nagasawa, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 901 days.

(21) Appl. No.: 10/286,271

(22) Filed: Nov. 1, 2002

(65) Prior Publication Data

US 2003/0075668 A1    Apr. 24, 2003

Related U.S. Application Data

(63) Continuation-in-part of application No. 09/080,702, filed on May 18, 1998, now abandoned.

(30) Foreign Application Priority Data

May 21, 1997 (JP) .................................. 9-131041

(51) Int. Cl.
*H04N 5/232* (2006.01)
*H04N 7/18* (2006.01)
*G02B 7/04* (2006.01)

(52) U.S. Cl. ...................... 348/353; 348/79; 250/201.3

(58) Field of Classification Search ................ 348/353, 348/354, 350, 349, 348, 79; 250/201.7
See application file for complete search history.

(56) References Cited

U.S. PATENT DOCUMENTS

| | | | | |
|---|---|---|---|---|
| 4,350,884 A | * | 9/1982 | Vollath ..................... | 250/201.7 |
| 4,829,374 A | | 5/1989 | Miyamoto et al. | |
| 4,897,537 A | * | 1/1990 | Miyamoto et al. ........ | 250/201.3 |
| 5,003,165 A | * | 3/1991 | Sarfati et al. ............. | 250/201.2 |
| 5,101,277 A | | 3/1992 | Kanata | |
| 5,245,173 A | * | 9/1993 | Yamana et al. .......... | 250/201.3 |
| 5,404,163 A | | 4/1995 | Kubo | |
| 5,604,344 A | * | 2/1997 | Finarov ................... | 250/201.3 |
| 5,675,141 A | | 10/1997 | Kukihara | |
| 5,790,710 A | | 8/1998 | Price et al. | |
| 5,886,813 A | * | 3/1999 | Nagasawa ................ | 250/201.3 |
| 5,932,871 A | | 8/1999 | Nakagawa et al. | |
| 6,043,475 A | * | 3/2000 | Shimada et al. ......... | 250/201.3 |

FOREIGN PATENT DOCUMENTS

| | | |
|---|---|---|
| JP | 56-1022 | 1/1981 |
| JP | 57-207210 | 12/1982 |
| JP | 6-78112 | 3/1994 |

* cited by examiner

*Primary Examiner*—Luong T. Nguyen
(74) *Attorney, Agent, or Firm*—Frishauf, Holtz, Goodman & Chick, P.C.

(57) ABSTRACT

An automatic focal point sensing device includes an image sensor on which an optical image is projected and which photoelectrically converts the image pixel by pixel to generate image data, a first calculation circuit which generates more than one pixel block, each pixel block being the sum of consecutive pixel data items, calculates one of the sum of the differences between signal levels of two adjacent pixel blocks and the sum of the square of each of the differences of two adjacent pixel blocks as a contrast value, and which determines more than one contrast value by changing a combination of pixel data items contained in each pixel block, and a second calculation circuit for calculating the sum of the contrast values determined by the first calculation circuit as an evaluation value and determining the degree of focusing on the basis of the evaluation value.

23 Claims, 4 Drawing Sheets

AUTOMATIC FOCAL POINT SENSING DEVICE

CROSS-REFERENCE TO RELATED APPLICATIONS

This is a Continuation-in-Part application of U.S. patent application Ser. No. 09/080,702, filed May 18, 1998 now abandoned, the entire contents of which are incorporated herein by reference.

BACKGROUND OF THE INVENTION

The invention relates to an automatic focal point sensing device that calculates the degree of focusing by use of an image evaluation function.

It is well-known that the optical image formed by a lens has the maximum amplitude of brightness of the image, or the maximum contrast, when it is in focus. This phenomenon takes place because the intensity of light (power spectrum) at each spatial frequency of the optical image becomes the largest when the image is in focus. A method of sensing the position of the focal point making use of the phenomenon has been considered. Known devices based on such a method are as follows.

In the focal point sensing device disclosed in Jpn. Pat. Appln. KOKAI Publication No. 56-1022, a self-scanning photoelectric device composed of very small photoelectric elements is used. The signal obtained by dividing the difference in photoelectronic output between two very small photoelectric elements by the sum of photoelectric outputs is extracted. The peak value of the signal in a definite scanning period is used as a contrast signal.

In the focus sensing device disclosed in Jpn. Pat. Appln. KOKAI Publication No. 57-207210, nonlinear operation is performed on the outputs of two sets of light-receiving elements provided in front of and behind an estimated focal point plane of the optical system by calculating the difference in output between two preset combinations of light-receiving elements. The nonlinear operation enables the position of the optical system to be sensed. Furthermore, of these sense signals, the difference between two sense signals is computed. From the result, the position of the optical system is determined. In the unfocused region, an analog signal corresponding to the position of the optical system is outputted, whereas in the focused region with a latitude, an in-focus signal of a specific level is outputted.

In the image taking-in device disclosed in Jpn. Pat. Appln. KOKAI Publication No. 6-78112, charges read with a charge transfer clock from the individual pixels of a CCD image sensor are stored sequentially. On the CCD image sensor, the subject image formed by an image forming optical system is projected. At the same time, resetting is done in a period equal to an integral multiple of the half period of the charge transfer clock and a specific number of adjacent pixels are added. The added charges are sampled. The pixel input range at the time when the subject is taken in from the CCD image sensor is set to the pixel range equal to an integral multiple of the maximum number of pixels that can be added during the reset period. This makes the subject taking-in range constant, improving the image evaluation accuracy.

BRIEF SUMMARY OF THE INVENTION

The object of the present invention is to provide an automatic focal point sensing device capable of sensing the focal point stably with high accuracy.

An automatic focal point sensing device according to the present invention comprises: an image sensor on which an optical image of a specimen is projected and which photoelectrically converts the image pixel by pixel to generate image data; a first calculation circuit which generates more than one pixel block, each pixel block being the sum of consecutive pixel data items in a specific range in the image data generated by the image sensor, calculates one of the sum of the differences between two adjacent pixel blocks and the sum of the square of each of the differences of two adjacent pixel blocks as the contrast value of the image, and which determines more than one contrast value of the image by changing a combination of pixel data items contained in each pixel block each time image data is inputted; and a second calculation circuit for calculating the sum of the contrast values determined by the first calculation circuit as an evaluation value and determining the degree of focusing for the specimen on the basis of the evaluation value.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
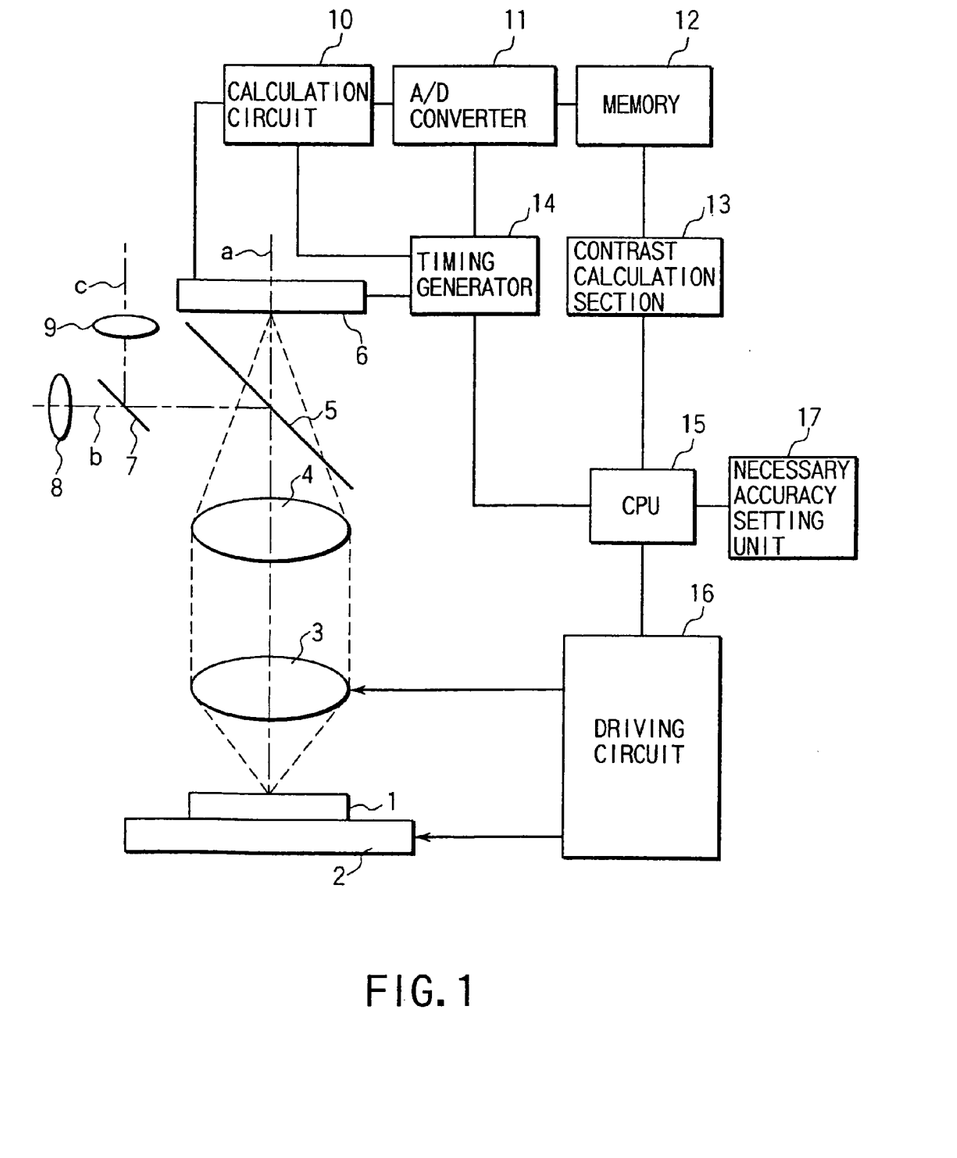
FIG. 1 shows the configuration of an automatic focal point sensing device according to a first to a third embodiment of the present invention.

FIG. 1 shows the configuration of an automatic focal point sensing device according to a first embodiment of the present invention. The automatic focal point sensing device is applied to a microscope. As shown in FIG. 1, a specimen 1 is placed on a stage 2 and is on an observation optical path (observation optical axis) a. On the observation optical path a, there are provided an optical system composed of an object lens 3 and an image-forming lens 4, a half mirror 5, and an image sensor 6. A half mirror 7 and an eyepiece 8 are provided on an observation optical path (observation optical axis) b crossing the observation optical path a at right angles at the half mirror 5. A taking lens 9 is provided on a photographing optical path (observation optical axis) c crossing the observation optical path b at right angles at the half mirror 7.

A calculation circuit 10 is connected to the image sensor 6. A memory 12 is connected to the calculation circuit 10 via an A/D converter 11. A contrast calculation section 13 is connected to the memory 12. A timing generator 14 is connected to the image sensor 6, calculation circuit 10, and A/D converter 11. The contrast calculation section 13 and timing generator 14 are connected to a CPU 15. A driving circuit 16 and a necessary accuracy setting unit 17 are connected to the CPU 15. The driving circuit 16 is coupled with the stage 2 and object lens 3.

In the automatic focal point sensing device, the optical image of the specimen 1 is directed to the image sensor 6 via the object lens 3, image-forming lens 4, and half mirror 5, thereby projecting the image of the specimen 1 on the image sensor 6. The image forming lens 4 projects the image of the specimen 1 in the estimated focal point position on the image sensor 6 via the half mirror 5. The image sensor 6 is composed of a line sensor. When the image-forming lens 4 has projected the image in the estimated focal point position or in front of and behind the estimated focal point, the image sensor 6 photoelectrically converts the image pixel by pixel and outputs the result to the calculation circuit 10 in the form of image data consisting of pixel image data items.

The calculation circuit 10 performs specific processes on the inputted image data, including the shaping of waveforms. The A/D converter 11 converts the image data processed at the calculation circuit 10 into a digital signal. The memory 12 temporarily stores the image data digitized at the A/D converter 11. The contrast calculation section 13 reads the image data corresponding to a preset image evaluation range from the image data stored in the memory 12.

The contrast calculation section 13 treats a set of consecutive pixels indicated by the pixel data as one pixel block, calculates the sum of the differences between signal levels of adjacent pixel blocks or the sum of the square of each of those differences as the contrast value of the image, and outputs the result to the CPU 15. The timing generator 14 outputs not only a driving pulse to the image sensor 6 but also a timing pulse for performing a signal process to the calculation circuit 10 and A/D converter 11.

The CPU 15 not only gives a control instruction to the timing generator 14 but also reads the contrast value calculated at the contrast calculation section 13 and compares the contrast value with the preset contrast value in focus to find the direction of the deviation from the focal point and the amount of the deviation. On the basis of the direction of the deviation from the focal point and the amount of the deviation, the driving circuit 16 drives either the stage 2 or the object lens 3 in the direction of the optical axis for focusing.

The necessary accuracy setting unit 17 enables the operator to preset the order of the contrast value needed for focusing. The preset contrast value corresponds to the needed focusing accuracy. For example, when high focusing accuracy is needed, the operator turns on a "High" switch (not shown) on the necessary accuracy setting unit 17; when low focusing accuracy meets the requirement, the operator turns on a "Low" switch on the necessary accuracy setting unit 17.

Next, the operation of the automatic focal point sensing device constructed as described above will be explained. When a light source (not shown) has projected light on the specimen 1, the image of the specimen 1 passes through the object lens 3, image-forming lens 4, and half mirror 5, and is projected on the image sensor 6. The image sensor 6 performs photoelectric conversion of the image pixel by pixel according to the driving pulse outputted from the timing generator 14 and sends the result to the calculation circuit 10 in the form of image data consisting of pixel data.

After the image data sent to the calculation circuit 10 has been subjected to specific processes, including waveform shaping, it is sent to the A/D converter 11, which converts it into a digital signal according to the timing pulse outputted from the timing generator 14. The digital signal is stored in the memory 12.

In this state, the contrast calculation section 13 reads only the pixel data within the preset image evaluation range in the inputted image data from the pixel data stored in the memory 12. Then, the contrast calculation section 13 treats a set of consecutive pixels as one pixel block. The contrast calculation section 13 calculates the sum of the differences between signal levels of adjacent pixel blocks or the sum of the square of each of those differences as the contrast value of the image. Furthermore, the contrast calculation section 13 calculates more than one contrast value of the image by changing, at least once. CPU 15 calculates the sum of the contrast values calculated by the contrast calculation section 13 as an contrast evaluation value, and calculates the degree of focusing for the specimen 1 on the basis of the contrast evaluation value.

Figures 2A, 2B:
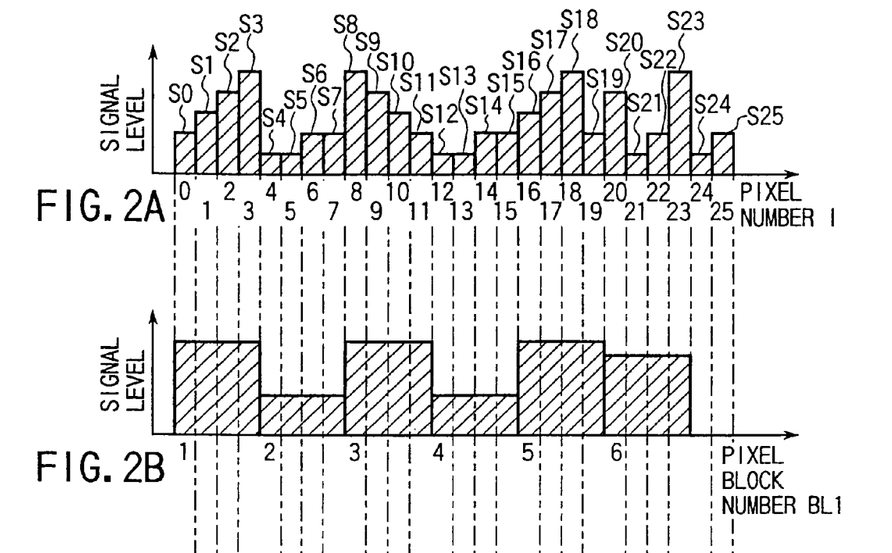
FIG. 2A shows the relationship between pixel number I and the signal level of pixel in the image data related to the first to third embodiments of the present invention.
FIG. 2B shows the relationship between pixel block BL1 and the signal level of pixel block in the first to third embodiments of the present invention.
Figure 2C:
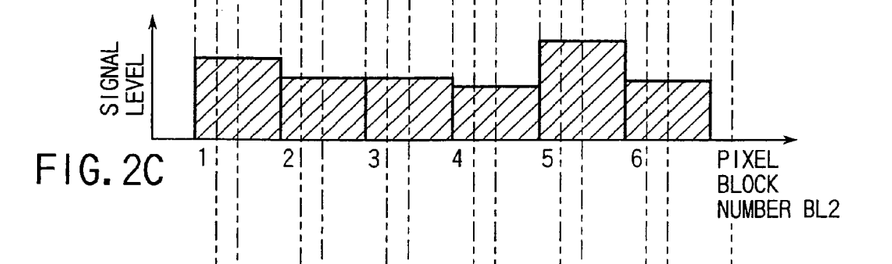
FIG. 2C shows the relationship between pixel block BL2 and the signal level of pixel block in the first to third embodiments of the present invention.
Figure 2D:
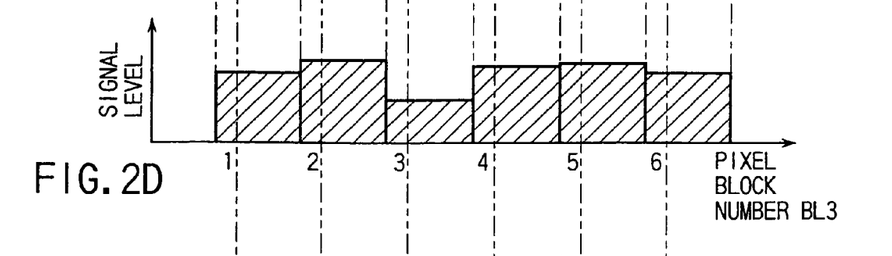
FIG. 2D shows the relationship between pixel block BL3 and the signal level of pixel block in the first to third embodiments of the present invention.
Figure 2E:
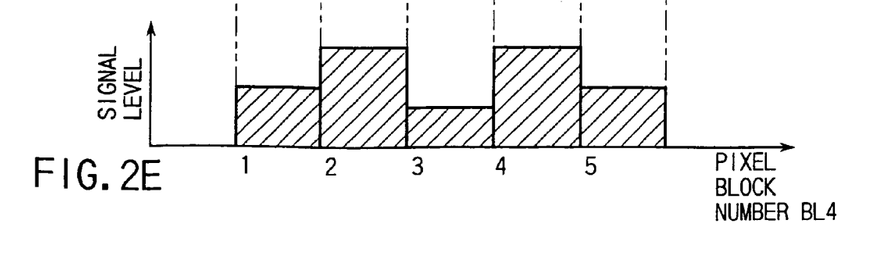
FIG. 2E shows the relationship between pixel block BL4 and the signal level of pixel block in the first to third embodiments of the present invention.

FIG. 2A shows the relationship between pixel number I and the signal level of pixel in the image data. FIG. 2B shows the relationship between pixel block BL1 and the signal level of pixel block. FIG. 2C shows the relationship between pixel block BL2 and the signal level of pixel block. FIG. 2D shows the relationship between pixel block BL3 and the signal level of pixel block. FIG. 2E shows the relationship between pixel block BL4 and the signal level of pixel block. Although FIG. 2A shows the signal levels ranging from pixel number I(0) to pixel number I(25) for the sake of convenience, the image evaluation range is made up of an n+1 number of pixels from pixel number I(0) to I(n). Similarly, for convenience sake, the pixels in FIGS. 2B to 2E correspond to those from pixel number I(0) to pixel number I(25) in FIG. 2A.

As shown in FIG. 2A, one pixel block consists of four pixels and the signal levels of pixel numbers I(0), I(1), I(2), . . . , I(n) in the image evaluation range are determined to be S0, S1, S2, . . . , Sn, respectively.

As shown in FIG. 2B, it is assumed that pixel block BL1(1) consists of pixel numbers I(0) to I(3) and pixel block BL1(2) consists of pixel numbers I(4) to I(7). The contrast value EF(0) at that time is determined by the following equation (1):

$$EF(0) = |(S0 + S1 + S2 + S3) - (S4 + S5 + S6 + S7)| + \\ |(S8 + S9 + S10 + S11) - (S12 + S13 + S14 + S15)| + \ldots \quad (1)$$

Similarly, as shown in FIG. 2C, it is assumed that pixel block BL2(1) consists of pixel numbers I(1) to I(4) and pixel block BL2(2) consists of pixel numbers I(5) to I(8). The contrast value EF(1) at that time is determined by the following equation (2):

$$EF(1) = |(S1 + S2 + S3 + S4) - (S5 + S6 + S7 + S8)| + \quad (2)$$
$$|(S9 + S10 + S11 + S12) - (S13 + S14 + S15 + S16)| +, ...$$

Similarly, as shown in FIG. 2D, it is assumed that pixel block BL3(1) consists of pixel numbers I(2) to I(5) and pixel block BL3(2) consists of pixel numbers I(6) to I(9). The contrast value EF(2) at that time is determined by the following equation (3):

$$EF(2) = |(S2 + S3 + S4 + S5) - (S6 + S7 + S8 + S9)| + \quad (3)$$
$$|(S10 + S11 + S12 + S13) - (S14 + S15 + S16 + S17)| +, ...$$

Similarly, as shown in FIG. 2E, it is assumed that pixel block BL4(1) consists of pixel numbers I(3) to I(6) and pixel block BL4(2) consists of pixel numbers I(7) to I(10). The contrast value EF(3) at that time is determined by the following equation (4):

$$EF(3) = |(S3 + S4 + S5 + S6) - (S7 + S8 + S9 + S10)| + \quad (4)$$
$$|(S11 + S12 + S13 + S14) - (S15 + S16 + S17 + S18)| +, ...$$

In this way, the contrast calculation section 13 determines contrast values EF(0), EF(1), EF(2), EF(3) by shifting a combination of pixels contained in each pixel block pixel by pixel, and outputs the contrast values to the CPU 15.

Thereafter, the CPU 15 calculates the sum of the contrast values EF(0), EF(1), . . . , that is, EF(0)+EF(1)+F(2)+EF(3), treats the result as a contrast evaluation value, and determines the degree of focusing for the specimen 1 on the basis of the contrast evaluation value.

As described above, with the first embodiment, all the contrast information to be evaluated in the image signal sensed by the image sensor 6 are evaluated. As a result, even if the image projected on the image sensor 6 has shifted slightly in the direction perpendicular to the optical axis of the object lens 3 in the course of focusing, the contrast evaluation value will never change abruptly, providing a stable image evaluation.

It is assumed that the approach of the first embodiment is applied to a system where two optical images in front of and behind the estimated focal point are projected on the image sensor 6 and the contrast evaluation values of the two images are compared with each other to adjust the focal point, that is, a system of the optical path difference type. With the optical path difference type, the image evaluation ranges of the two images in front of and behind the estimated focal point must coincide with each other. However, when various optical elements are combined for observation under a microscope, the image evaluation ranges of the two images in front of and behind the estimated focal point projected on the image sensor 6 may be shifted by several pixels.

In that case, although the same image has been projected, the results of contrast evaluations differ as shown in FIGS. 2B to 2E. Because it is possible to achieve image evaluations on the basis of evaluation results by calculating the contrast evaluation values from the contrast values, stable image evaluations can always be obtained.

While in the first embodiment, one pixel block has been made up of four pixels, it may be composed of a suitable number of pixels other than four pixels.

An automatic focal point sensing device according to a second embodiment of the present invention has the same configuration as that of FIG. 1.

Figure 3:
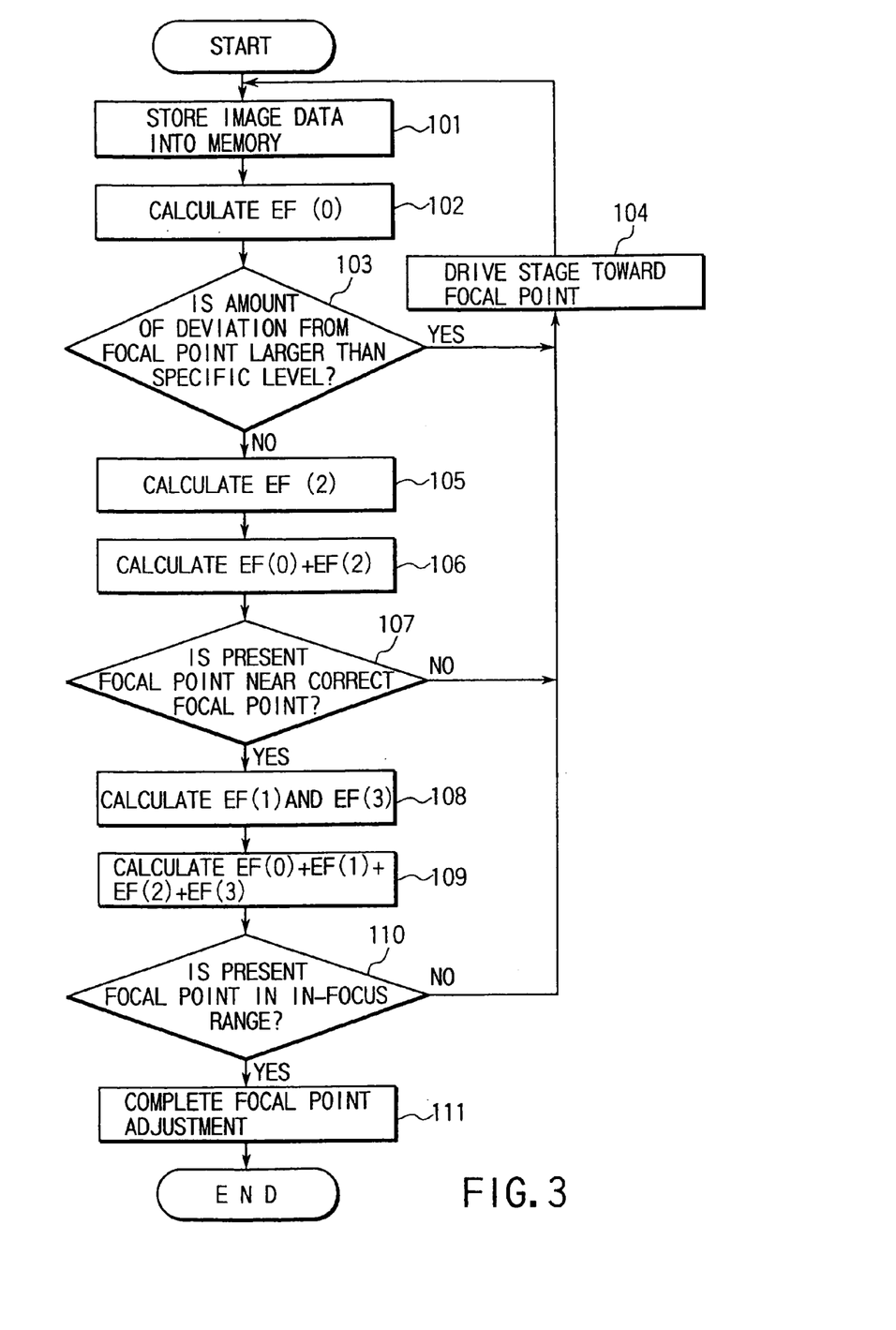
FIG. 3 is a flowchart for the operation of an automatic focal point sensing device according to a second embodiment of the present invention.

FIG. 3 is a flowchart for the operation of the automatic focal point sensing device. The operation of the automatic focal point sensing device will be described by reference to FIG. 3. First, at step 101, the CPU 15 causes the memory 12 to store the image data. As described above, in this case, too, the image of the specimen 1 is directed through the object lens 3, image-forming lens 4, and half mirror 5, and is projected onto the image sensor 6. The image sensor 6 photoelectrically converts the image from the image sensor 6 pixel by pixel and outputs the result as image data. After the image data has been subjected to specific processes, including waveform shaping, at the calculation circuit 10, it is converted into a digital signal at the A/D converter 11. The digital signal is stored in the memory 12.

Then, at step 102, the contrast calculation section 13 reads from the memory the pixel data corresponding to a preset image evaluation range in the image data stored in the memory 12 sequentially, treats a set of consecutive pixels as one pixel block, and calculates the sum of the differences between signal levels of adjacent pixel blocks or the sum of the square of each of those differences as contrast value EF(0) of the image. In this case, as shown in FIG. 2A, one pixel block consists of four pixels. The signal levels of pixel numbers I(0), I(1), I(2), . . . , I(n) in the image evaluation range are determined to be S0, S1, S2, . . . , Sn, respectively.

Next, as shown in FIG. 2B, it is assumed that pixel block BL1(1) consists of pixel numbers I(0) to I(3) and pixel block BL1(2) consists of pixel numbers I(4) to I(7). The contrast value EF(0) at that time is determined by the following equation (5):

$$EF(0) = |(S0 + S1 + S2 + S3) - (S4 + S5 + S6 + S7)| + \quad (5)$$
$$|(S8 + S9 + S10 + S11) - (S12 + S13 + S14 + S15)| +, ...$$

Then, at step 103, the CPU 10 reads contrast value EF(0) from the contrast calculation section 13 and determines the amount of deviation of the present focal point from the correct focal point, that is, determines whether the difference between contrast value EF(0) and a first predetermined contrast value (a contrast value related to the correct focal point) is larger than a first specific level. If the amount of deviation is larger than the first specific level, the CPU 15 will determine that a highly-accurate contrast evaluation is not necessary. Then, at step 104, the CPU 15 calculates how much to drive the stage 2 for focusing and the direction of driving (a vertical direction) on the basis of contrast value EF(0) and outputs the result to the driving circuit 16, thereby controlling the driving of the stage 2 in the direction of observation optical axis a. Then, the process returns to the step 101.

If at step 103, the amount of deviation is equal to or smaller than the specific level, the CPU 15 determines that the present focal point is relatively close to the correct focal point and gives the contrast calculation section 13 an instruction to calculate contrast value EF(2) for a pixel block differing from the pixel block for contrast value EF(0).

Then, at step 105, the contrast calculation section 13 calculates contrast value EF(2) according to the instruction from the CPU 15. In this case, as shown in FIG. 2D, it is assumed that pixel block BL3(1) consists of pixel numbers I(2) to I(5) and pixel block BL3(2) consists of pixel numbers I(6) to I(9). . . . The contrast value EF(2) at that time is determined by the following equation (6):

$$EF(2) = |(S2 + S3 + S4 + S5) - (S6 + S7 + S8 + S9)| + \qquad (6)$$
$$|(S10 + S11 + S12 + S13) - (S14 + S15 + S16 + S17)| +, \ldots$$

Then, at step 106, the CPU 10 reads contrast value EF(2) from the contrast calculation section 13 and calculates EF(0)+EF(2). At step 107, the CPU 10 determines whether the present focal point is in the vicinity of the correct focal point, that is, determines whether the difference between contrast value EF(0)+EF(2) and a second predetermined contrast value (a contrast value related to the correct focal point) is larger than a second specific level. If the difference is larger than the second specific level and the present focal point is not in the vicinity of the correct focal point, the CPU 15, at step 104, will calculate how much to drive the stage 2 for focusing and the direction of driving on the basis of contrast value EF(0)+EF(2) and outputs the result to the driving circuit 16, thereby controlling the driving of the stage 2 in the direction of observation optical axis a. Then, the process returns to the step 101.

If at step 107, the difference is equal to or smaller than the second specific level and the present focal point is in the vicinity of the correct focal point, the CPU 15 will go to the final stage of focusing and give the contrast calculation section 13 an instruction to calculate contrast values EF(1) and EF(3) for pixel blocks differing from the pixel blocks for contrast values EF(0) and EF(2).

Then, at step 108, the contrast calculation section 13 calculates contrast values EF(1) and EF(3) according to the instruction from the CPU 15. In this case, as shown in FIG. 2C, it is assumed that pixel block BL2(1) consists of pixel numbers I(1) to I(4) and pixel block BL2(2) consists of pixel numbers I(5) to I(8). The contrast value EF(1) at that time is determined by the following equation (7):

$$EF(1) = |(S1 + S2 + S3 + S4) - (S5 + S6 + S7 + S8)| + \qquad (7)$$
$$|(S9 + S10 + S11 + S12) - (S13 + S14 + S15 + S16)| +, \ldots$$

Furthermore, as shown in FIG. 2E, it is assumed that pixel block BL4(1) consists of pixel numbers I(3) to I(6) and pixel block BL4(2) consists of pixel numbers I(7) to I(10). The contrast value EF(3) at that time is determined by the following equation (8):

$$EF(3) = |(S3 + S4 + S5 + S6) - (S7 + S8 + S9 + S10)| + \qquad (8)$$
$$|(S11 + S12 + S13 + S14) - (S15 + S16 + S17 + S18)| +, \ldots$$

Then, at step 109, the CPU 15 reads contrast values EF(1) and EF(3) from the contrast calculation section 13 and calculates EF(0)+EF(1)+EF(2)+EF(3). At step 110, the CPU 15 determines whether the present focal point is in the in-focus range, that is, determines whether the difference between contrast value EF(0)+EF(1)+EF(2)+EF(3) and a third predetermined contrast value (a contrast value related to the correct focal point) is equal to or smaller than a third specific level.

If the present focal point is not in the in-focus range, the CPU 15, at step 104, will calculate how much to drive the stage 2 for focusing and the direction of driving on the basis of contrast value EF(0)+EF(1)+EF(2)+EF(3) and outputs the result to the driving circuit 16. The driving circuit 16 drives either the stage 2 or the object lens 3 in the direction of observation optical axis a on the basis of the result. If at step 110, the present focal point is in the in-focus range, the CPU 10 will end the focus adjusting operation at step 111.

In the above explanation, the following relations hold: the first contrast value×4=the second contrast value×2=the third contrast value, and the first specific level×4>the second specific level×2>the third specific level. In the second embodiment, the number of times the contrast value of the image is determined is three times (step 102, 106, and 109). The number of times is determined on the basis of the contrast value needed for focusing or adjusting the focal point. For example, highly-accurate contrast values are not needed, the number of times is determined to be once or twice, whereas highly-accurate contrast values are necessary, the number of times is determined to be three times or more.

With the second embodiment, when a relatively simple contrast evaluation function, such as EF(0), is used in an area where the deviation from the focal point is great, this gives priority to the shortening of processing time over the accuracy of focusing. As the present focal point gets closer to the correct focal point, the contrast evaluation function is changed to a complex, highly-accurate contrast evaluation function, such as EF(0)+EF(2) or EF(0)+EF(1)+EF(2)+EF(3), thereby realizing high-speed, high-accuracy focal point adjustment.

Specifically, with the second embodiment, the contrast evaluation function used for focal point adjustment can be chosen from EF(0), EF(0)+EF(2), and EF(0)+EF(1)+EF(2)+EF(3), depending on the amount of deviation from the correct focal point. When focusing with very high accuracy is needed as in photography, the operator turns on the "High" switch on the necessary accuracy setting unit 17 to choose a highly-accurate contrast evaluation function consisting of EF(0)+EF(1)+EF(2)+EF(3), thereby finding a highly-accurate contrast evaluation value. In this case, the image of the specimen 1 is directed to the taking lens 9 through the half mirrors 5 and 7 to photographed by a camera (not shown).

When the specimen is observed while it is being moved as in visual inspection, that is, when higher accuracy than in photography is not needed but a higher-speed follow-up performance is needed, the operator turns on the "Low" switch on the necessary accuracy setting unit 17 to choose a contrast evaluation function consisting of EF(0) or EF(0)+EF(2), thereby finding a low-accuracy contrast evaluation value. In this case, the image of the specimen 1 is directed to the eyepiece 8 through the half mirrors 5 and 7, and is observed with the naked eye. In this way, selecting the contrast evaluation function according to the focal point adjusting mode enables high-speed, high-accuracy focal point adjustment according to the objective.

An automatic focal point sensing device according to a third embodiment of the present invention has the same configuration as that of FIG. 1.

Figure 4:
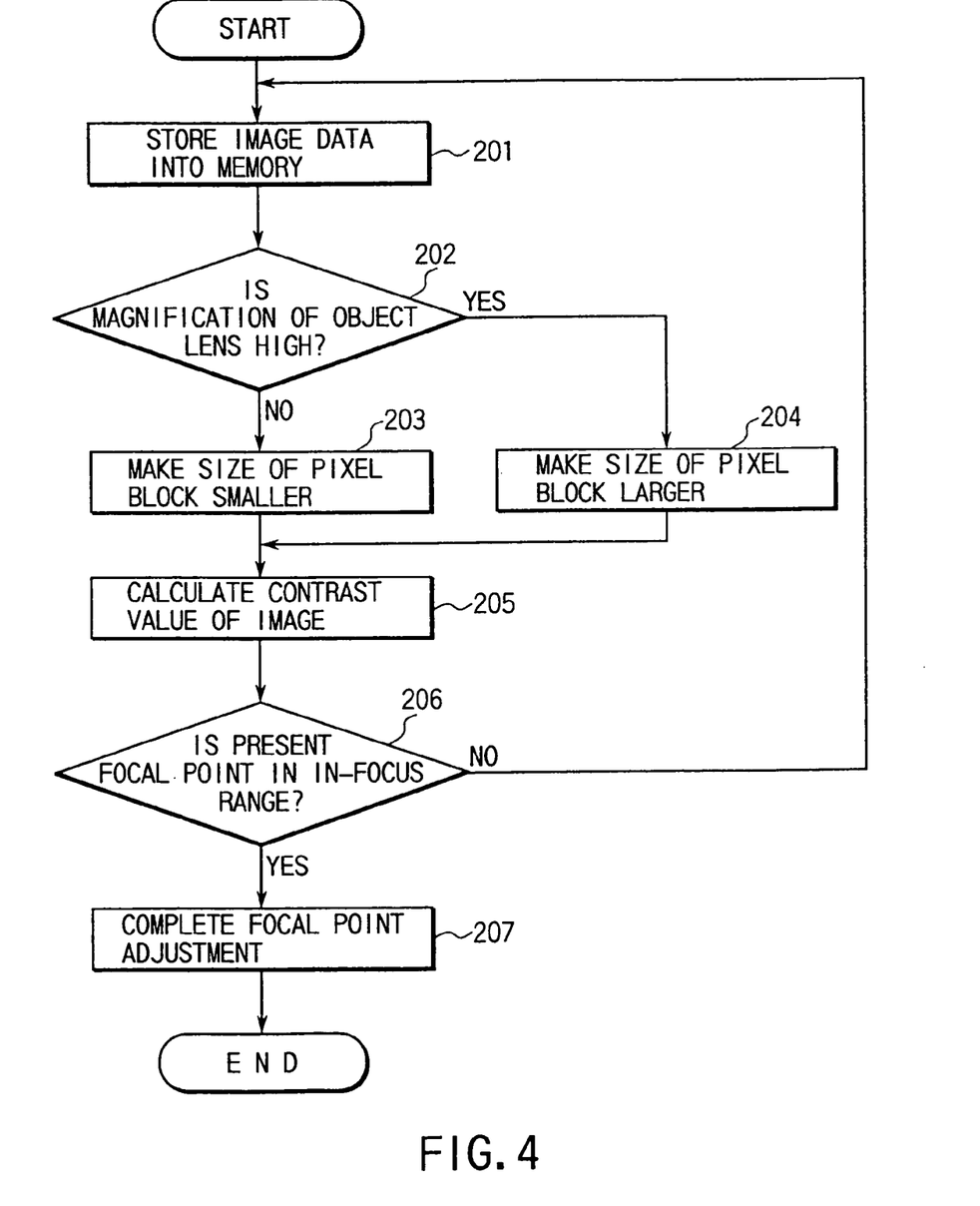
FIG. 4 is a flowchart for the operation of an automatic focal point sensing device according to a third embodiment of the present invention.

FIG. 4 is a flowchart for the operation of the automatic focal point sensing device. The operation of the automatic focal point sensing device will be described by reference to FIG. 4. First, at step 201, the CPU 15 causes the memory 12 to store the image data. As described above, in this case, too, the image of the specimen 1 is directed through the object lens 3, image-forming lens 4, and half mirror 5, and is projected onto the image sensor 6. The image sensor 6 photoelectrically converts the image from the image sensor 6 pixel by pixel and outputs the result as image data. After the image data has been subjected to specific processes, including waveform shaping, at the calculation circuit 10, it is converted into a digital signal at the A/D converter 11. The digital signal is stored in the memory 12.

Next, at step 202, the CPU 15 determines whether the magnification of the object lens 3 is high, or whether the magnification of the object lens 3 is higher than a specific magnification. If the magnification of the object lens 3 is equal to or lower than the specific magnification (low magnification), the CPU 15, at step 203, will give the contrast calculation section 13 an instruction to reduce the number of pixels contained in one pixel block. According to the instruction, the contrast calculation section 13 decreases the number of pixels (in this case, the number is equal to or larger than 2) contained in each pixel block (e.g., decreases the number of pixels by one), thereby making the size of each pixel block smaller.

If at step 202, the magnification of the object lens 3 is higher than the specific magnification (high magnification), the CPU 15, at step 204, will give the contrast calculation section 13 an instruction to increase the number of pixels contained in one pixel block. According to the instruction, the contrast calculation section 13 increases the number of pixels contained in each pixel block (e.g., increases the number of pixels by one), thereby making the size of each pixel block larger.

Then, at step 205, the contrast calculation section 13 reads from the memory the pixel data corresponding to a preset image evaluation range in the image data stored in the memory 12 sequentially, treats a set of as many consecutive pixels as the number specified by the CPU 15 as one pixel block, and calculates the sum of the differences between the signal levels of adjacent pixel blocks or the sum of the square of each of those differences as the contrast value of the image. On the basis of the calculation result, the CPU 15, at step 206, determines whether the present focal point is in the in-focus range, that is, determines whether the difference between the contrast value and a preset contrast value (a contrast value related to the correct focal point) is equal to or smaller than a specific level.

If the present focal point is not in the in-focus range, the CPU 15 will return to step 201 and repeat the above-described processes. If at step 206, the present focal point is in the in-focus range, the CPU 15, at step 207, will end the focus adjusting operation.

When observation is made under a microscope with the magnification of the object lens being varied in the range from a very low magnification to a high magnification, the frequency distribution of the observed image changes considerably. In this case, too, the focal point can be sensed stably with high accuracy using the object lens 3 in the range from a very low magnification to a high magnification, because the size of pixel blocks can be changed according to the magnification of the object lens 3 in the second embodiment.

While in the third embodiment, the number of pixels in each pixel block has been changed according to the magnification of the object lens 3, the present invention is not restricted to this. The number of pixels in each pixel block may be changed according to optical conditions, such as the contrast value needed for focusing, the contrast value needed for focus adjustment, or the brightness of the image and then an evaluation function of the image may be selected. In the case that high resolution is required, e.g., the image is taken by a camera, high accuracy of focusing is necessary. And, in the case that the high resolution isn't required, e.g., the image is observed with the naked eye, the high accuracy of focusing is not necessary. Because the brightness of the image is reflected in the magnitude of the signal level of each pixel, the number of pixels in each pixel block is changed according to the degree of the brightness of the image, which changes the sum of the signal levels in each pixel block.

As described above, with the present invention, all the contrast information to be evaluated in the image signal is evaluated. As a result, even if the image projected on the image sensor has shifted slightly in the course of adjusting the focal point, the contrast evaluation value will never change abruptly, providing a stable image evaluation.

Furthermore, when a relatively simple contrast evaluation function is used in an area where the deviation from the focal point is great, this gives priority to the shortening of processing time over the accuracy of focusing. As the present focal point gets closer to the correct focal point, the contrast evaluation function is changed to a complex, highly-accurate contrast evaluation function, thereby realizing high-speed, high-accuracy focal point adjustment that is in tune with the objective.

Moreover, an evaluation function of the image can be selected by changing the size of each pixel block according to optical conditions, such as the amount of deviation from the focal point, the necessary accuracy for focus adjustment, the brightness of the image, or the magnification of the object lens. In this case, too, it is possible to realize high-speed, high-accuracy focal point adjustment that is in tune with the objective.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An automatic focal point sensing device comprising:
an image sensor on which an optical image of a specimen is projected and which photoelectrically converts the optical image, pixel by pixel, to generate image data;
first calculation means which treats a plurality of consecutive pixel data items in the image data generated by the image sensor into consecutive pixel blocks each including four consecutive pixel data items, calculates one of the sum of the differences between signal levels of any two adjacent ones of the pixel blocks and the sum of the squares of the differences as a first contrast value of the optical image, and which determines a second contrast value of the optical image by changing a combination of pixel data items contained in each pixel block; and
second calculation means for calculating the sum of the first and second contrast values determined by the first calculation means as an evaluation value and determining the degree of focusing for the specimen on the basis of the evaluation value.

2. An automatic focal point sensing device according to claim 1, wherein said first calculation means determines the number of times the contrast value of said optical image is calculated, on the basis of the contrast value necessary for focusing.

3. An automatic focal point sensing device according to claim 1, wherein said first calculation means determines the number of times the contrast value of said optical image is calculated in processes of sensing a focal point, on the basis of the contrast value necessary for each of the processes.

4. An automatic focal point sensing device according to claim 1, wherein said first calculation means determines the number of pixel data items contained in each of said pixel blocks, on the basis of the contrast value necessary for focusing.

5. An automatic focal point sensing device according to claim 1, wherein said first calculation means determines the number of pixel data items contained in each of said pixel blocks in processes of sensing a focal point, on the basis of the contrast value necessary for each of the processes.

6. An automatic focal point sensing device according to claim 1, wherein said first calculation means determines the number of pixel data items contained in each of said pixel blocks, on the basis of the brightness of said optical image.

7. An automatic focal point sensing device according to claim 1, further comprising an optical system for directing the optical image of said specimen to said image sensor, wherein said first calculation means determines the number of pixel data items contained in each of said pixel blocks, on the basis of optical conditions for said optical system.

8. An automatic focal point sensing device according to claim 1, further comprising:
a stage on which said specimen is placed;
an optical system for directing the optical image of said specimen to said image sensor; and
driving means for moving one of said stage and said optical system in the direction of the optical axis of said optical system.

9. An automatic focal point sensing device according to claim 8, wherein said driving means moves one of said stage and said optical system in the direction of the optical axis of said optical system on the basis of the degree of focusing determined by said second calculation means.

10. An automatic focal point sensing device according to claim 1, further comprising setting means for setting the accuracy of the evaluation value determined by said second calculation means.

11. An automatic focal point sensing device comprising:
a stage on which a specimen is to be placed;
an image sensor on which an optical image of said specimen is projected and which photoelectrically converts the optical image, pixel by pixel, to generate image data;
an optical system for directing the optical image of said specimen to said image sensor;
storage means for storing the image data generated by said image sensor;
first calculation means which treats a plurality of consecutive pixel data items in the image data stored in the storage means into consecutive pixel blocks each including four consecutive pixel data items, calculates one of the sum of the differences between signal levels of any two adjacent ones of the pixel blocks and the sum of the squares of the differences as a first contrast value of the optical image, and determines a second contrast value of the optical image by changing a combination of pixel data items contained in each pixel block;
second calculation means for calculating the sum of the first and second contrast values determined by the first calculation means as the evaluation value; and
determining the degree of focusing for the specimen on the basis of the evaluation value; and
driving means for moving one of said stage and said optical system in the direction of the optical axis of said optical system on the basis of the degree of focusing determined by said second calculation means.

12. An automatic focal point sensing device according to claim 1, wherein said first calculation means changes a combination of pixel data items a plurality of times, and calculates the second contrast value each time the combination of pixel data items is changed.

13. An automatic focal point sensing device comprising:
an image sensor on which an optical image of a specimen is projected and which photoelectrically converts the optical image, pixel by pixel, to generate image data;
first calculation means which treats a plurality of consecutive pixel data items within a predetermined range in the image data generated by said image sensor, and makes calculations with respect to the plurality of consecutive pixel data items, such that (i) said first calculation means combines the plurality of consecutive pixel data items into first pixel blocks each including four consecutive pixel data items, the four consecutive pixel data items of a first one of the first pixel blocks being consecutive from a first pixel data item, the four consecutive pixel data items of a second one of the first pixel blocks being consecutive from a fifth pixel data item, and calculates the sum of differences between signal levels of any two adjacent ones of the first pixel blocks as a first contrast value, (ii) said first calculation means combines the plurality of consecutive pixel data items into second pixel blocks each including four consecutive pixel data items, the four consecutive pixel data items of a first one of the second pixel blocks being consecutive from a second pixel data item, the four consecutive pixel data items of a second one of the second pixel blocks being consecutive from a sixth pixel data item, and calculates the sum of differences between signal levels of any two adjacent ones of the second pixel blocks as a second contrast value, (iii) said first calculation means combines the plurality of consecutive pixel data items into third pixel blocks each including four consecutive pixel data items, the four consecutive pixel data items of a first one of the third pixel blocks being consecutive from a third pixel data item, the four consecutive pixel data items of a second one of the third pixel blocks being consecutive from a seventh pixel data item, and calculates the sum of differences between signal levels of any two adjacent ones of the third pixel blocks as a third contrast value, and (iv) said first calculation means combines the plurality of consecutive pixel data items into fourth pixel blocks each including four consecutive pixel data items, the four consecutive pixel data items of a first one of the fourth pixel blocks being consecutive from a fourth pixel data item, the four consecutive pixel data items of a second one of the fourth pixel blocks being consecutive from an eighth pixel data item, and calculates the sum of differences between signal levels of any two adjacent ones of the fourth pixel blocks as a fourth contrast value; and second calculation means for calculating the sum of the first to fourth contrast values calculated by said first calculation means as an evaluation value, and determining the degree of focusing for the specimen on the basis of the evaluation value.

14. An automatic focal point adjusting method for a microscope which includes an objective lens for obtaining an optical image of a specimen, and an image sensor on which the optical image is projected from the objective lens and which photoelectrically converts the optical image, pixel by pixel, to generate image data, the automatic focal point adjusting method comprising the steps of:

a first step of combining a plurality of consecutive pixel data items in the image data generated by the image sensor into first pixel blocks each including a predetermined number of consecutive pixel data items, and calculating one of the sum of differences between signal levels of any two adjacent ones of the first pixel blocks and the sum of the squares of the differences as a first contrast value of the image;

a second step of determining, by using the first contrast value, whether or not a present focal-point displacement amount is more than a first predetermined level, and performing a focal point adjusting operation on the basis of the first contrast value when it is determined that the present focal-point displacement amount is more than the first predetermined level;

a third step of calculating a second contrast value, by using second pixel blocks which differ from the first pixel blocks in combination of pixel data items, on the basis of differences between signal levels of any two adjacent ones of the second pixel blocks, when it is determined in said second step that the present focal-point displacement amount falls within the first predetermined level; and a fourth step of calculating the sum of the first and second contrast values.

15. An automatic focal point adjusting method according to claim 14, wherein:

in said first step, the plurality of consecutive pixel data items are combined into first pixel blocks each consisting of four consecutive pixel data items, the four consecutive pixel data items of a first one of the first pixel blocks being consecutive from a first pixel data item, the four consecutive pixel data items of a second one of the first pixel blocks being consecutive from a fifth pixel data item;

in said third step, the plurality of consecutive pixel data items are combined into second pixel blocks each including four consecutive pixel data items, the four consecutive pixel data items of a first one of the second pixel blocks being consecutive from a third pixel data item, the four consecutive pixel data items of a second one of the second pixel blocks being consecutive from a seventh pixel data item, and wherein after the fourth step, the automatic focal point adjusting method further comprises:

a fifth step of determining, by using the sum of the first and second contrast values, whether or not the present focal-point displacement amount is more than a second predetermined level, and performing the focal point adjusting operation on the basis of the sum of the first and second contrast values, when it is determined that the present focal-point displacement amount is more than the second predetermined level;

a sixth step of, when it is determined in said fifth step that the present focal-point displacement amount falls within the second predetermined level, combining the plurality of consecutive pixel data items into third pixel blocks each consisting of four consecutive pixel data items, the four consecutive pixel data items of a first one of the third pixel blocks being consecutive from a second pixel data item, the four consecutive pixel data items of a second one of the third pixel blocks being consecutive from a sixth pixel data item, and calculating the sum of differences between signal levels of any two adjacent ones of the third pixel blocks as a third contrast value, and further combining the plurality of consecutive pixel data items into fourth pixel blocks each including four consecutive pixel data items, the four consecutive pixel data items of a first one of the fourth pixel blocks being consecutive from a fourth pixel data item, the four consecutive pixel data items of a second one of the fourth pixel blocks being consecutive from an eighth pixel data item, and calculating the sum of differences between signal levels of any two adjacent ones of the fourth pixel blocks as a fourth contrast value; and a seventh step of calculating the sum of the first to fourth contrast values, and determining, by using the sum thereof, whether or not the degree of focusing falls within a focusing range.

16. An automatic focal point adjusting method according to claim 14, wherein the number of pixel data items constituting the first and second pixel blocks in said first and third steps is increased when the objective lens is of a high magnification, and is decreased when the objective lens is of a low magnification.

17. An automatic focal point adjusting method for a microscope which comprises an objective lens for use in obtaining an optical image of a specimen, and an image sensor on which the optical image is projected from the objective lens and which photoelectrically converts the optical image, pixel by pixel, to generate image data, the automatic focal point adjusting method comprising the steps of:

a first step of combining a plurality of consecutive pixel data items of the image data generated by the image sensor, into first pixel blocks each including a predetermined number of consecutive pixel data items, and calculating one of the sum of differences between any signal levels of two adjacent ones of first pixel blocks and the sum of the squares of the differences as a first contrast value of the image; and a second step of calculating, by using second pixel blocks which differ from the first pixel blocks in combination of pixel data items, a second contrast value on the basis of differences between signal levels of any two adjacent ones of the second pixel blocks, wherein the number of pixel data items constituting the first and second pixel blocks in said first and second steps is increased when the objective lens is of a high magnification, and is decreased when the objective lens is of a low magnification.

18. An automatic focal point sensing device comprising:

an image sensor on which an optical image of a specimen is projected and which photoelectrically converts the optical image, pixel by pixel, to generate image data;

first calculation means which combines a plurality of consecutive pixel data items in the image data generated by said image sensor into consecutive pixel blocks each including a predetermined number of consecutive pixel data items, and calculates at least two contrast values of the optical image on the basis of differences between signal levels of any two adjacent ones of the pixel blocks; and second calculation means for calculating the sum of at least two contrast values calculated by said first calculation means as an evaluation value, and determining the degree of focusing for the specimen on the basis of the evaluation value, wherein the first calculation means changes a combination of the pixel data items constituting each of the pixel blocks at least one time, and then calculates a first contrast value by using the pixel blocks in which the combination of the pixel data items is not changed, and also calculates a second contrast value by using the pixel blocks in which the combination of the pixel data items is changed.

19. An automatic focal point sensing device according to claim 18, wherein the first calculation means changes the combination of the pixel data items a plurality of times, and calculates the second contrast value each time the combination is changed.

20. An automatic focal point sensing device comprising:
an image sensor on which an optical image of a specimen is projected and which photoelectrically converts the optical image, pixel by pixel, to generate image data;
first calculation means which combines a plurality of consecutive pixel data items in the image data generated by said image sensor into consecutive pixel blocks each including a predetermined number of consecutive pixel data items, and calculates a contrast value of the optical image on the basis of differences between signal levels of any two adjacent ones of the pixel blocks; and
second calculation means for calculating the sum of first and second contrast values calculated by said first calculation means as an evaluation value, and determining the degree of focusing for the specimen on the basis of the evaluation value, wherein:
the first calculation means changes a combination of the pixel data items constituting each of the pixel blocks at least one time, and then calculates the first contrast value by using the pixel blocks in which the combination of the pixel data items is not changed, and also calculates the second contrast value by using the pixel blocks in which the combination of the pixel data items is changed;

the first calculation means changes the combination of the pixel data items a plurality of times, and calculates the second contrast value each time the combination is changed, the number of the pixel data items constituting each of the pixel blocks is four;

the first calculation means changes the combination of the pixel data items three time, to thereby obtain three second contrast value; and the second calculation means calculates the sum of the first contrast value and the obtained three second contrast values as the evaluation value.

21. An automatic focal point sensing device according to claim 18, wherein:
the number of the pixel data items constituting each of the pixel blocks is four;
the first calculation means changes the combination of the pixel data items one time, to thereby obtain one second contrast value; and
the second calculation means calculates the sum of the first contrast value and the obtained second contrast value as the evaluation value.

22. An automatic focal point sensing device according to claim 18, wherein the first calculation means calculates the sum of differences between signal levels of any two adjacent ones of the pixel blocks as the contrast value.

23. An automatic focal point sensing device according to claim 18, wherein the first calculation means calculates the sum of the squares of the differences between signal levels of any two adjacent ones of the pixel blocks as the contrast value.

* * * * *